United States Patent [19]
Ostrowski

[11] 3,768,145
[45] Oct. 30, 1973

[54] METHOD OF IN LINE COATING OF GALVANIZED TUBING

[75] Inventor: Arthur E. Ostrowski, Alsip, Ill.

[73] Assignee: Allied Tube & Conduit Corporation, Harvy, Ill.

[22] Filed: Sept. 4, 1970

[21] Appl. No.: 69,548

Related U.S. Application Data

[63] Continuation-in-part of Ser. No. 887,254, Dec. 22, 1969, abandoned.

[52] U.S. Cl. .................... 29/458, 29/33 K, 29/460, 29/477.7
[51] Int. Cl. ..... B23p 3/00, B23p 19/04, B23p 25/00
[58] Field of Search ...................... 29/429, 460, 458, 29/477.7, 33 K

[56] References Cited
UNITED STATES PATENTS

| | | |
|---|---|---|
| 2,927,371 | 3/1960 | Hays ..................................... 29/429 |
| 3,226,817 | 1/1966 | Simborg et al. .................... 29/460 X |
| 3,271,850 | 9/1966 | Menne et al. .......................... 29/460 |
| 3,394,450 | 7/1968 | Gill et al. ........................... 29/460 X |
| 3,417,453 | 12/1968 | Clarke ................................. 29/460 |
| 3,457,626 | 7/1969 | Coad ................................ 29/460 X |
| 3,561,096 | 2/1971 | Krengel et al. ....................... 29/460 |

Primary Examiner—Charlie T. Moon
Attorney—McDougall, Hersh and Scott

[57] ABSTRACT

This application discloses a machine and method for manufacturing galvanized tubing in which the interior surface of galvanized tubing is painted or coated with a protective film. The machine includes apparatus for applying paint to the strip material from which the tubing is formed or to the interior of the formed tubing in such a way that the manufacturing of the tubing can proceed in a continuous manner so as to achieve high rates of production.

6 Claims, 9 Drawing Figures

PATENTED OCT 30 1973 3,768,145
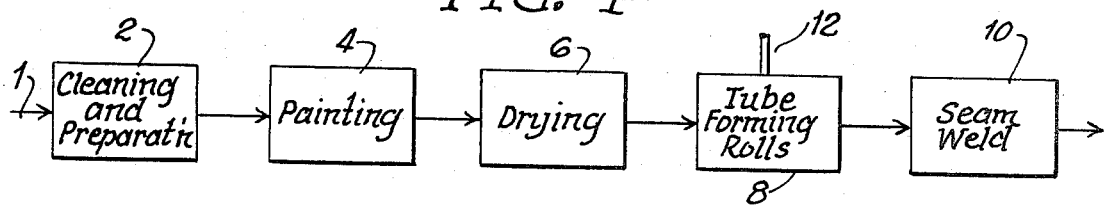
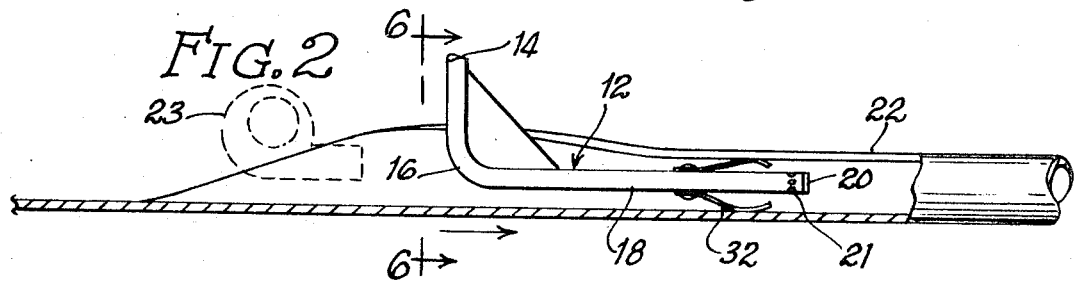
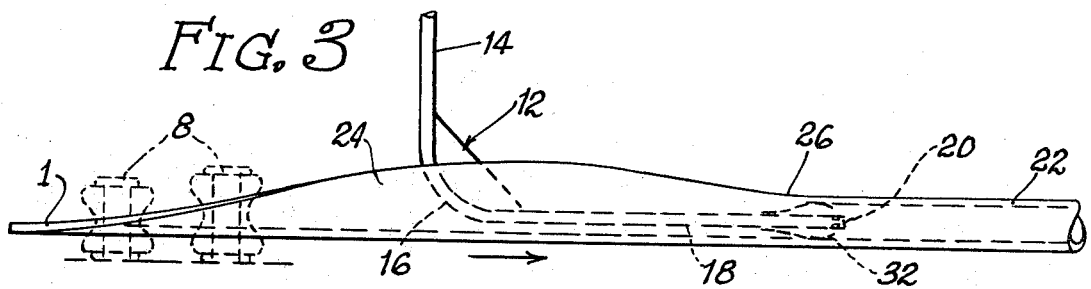
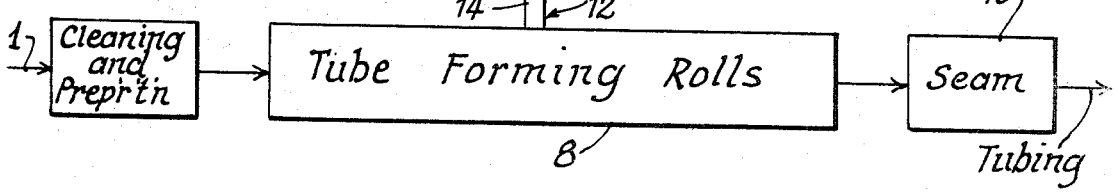
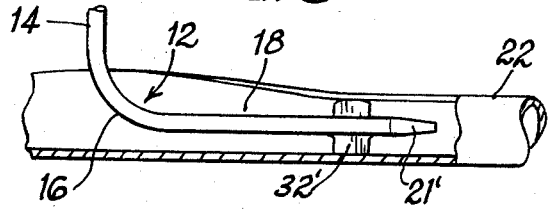
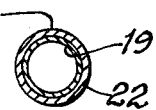
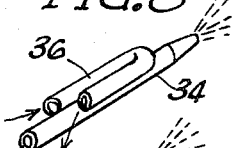
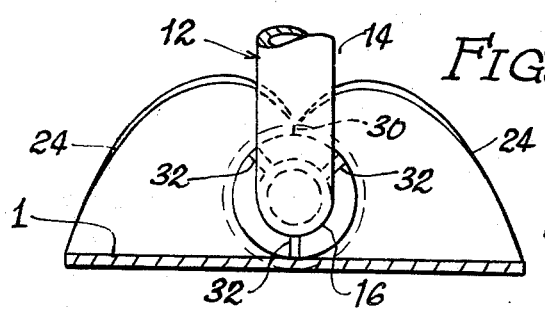
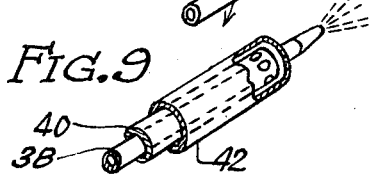
INVENTOR
Arthur E. Ostrowski
by McDougall, Hersh and Scott
Attys

METHOD OF IN LINE COATING OF GALVANIZED TUBING

BACKGROUND OF THE INVENTION

This application is a continuation-in-part of application Ser. No. 887,254 filed Dec. 22, 1969, now abandoned for "In Line Coating Of Galvanized Tubing."

This invention relates to methods and machines for continuously forming and galvanizing steel tubing. More specifically, it relates to improvements in such machines wherein the interior surface of the formed tubing is coated with paint or other suitable protective films.

The continuous manufacture of tubing and the galvanizing of same is disclosed in the U.S. Pat. to Krengel et al. No. 3,122,114. In this patent a machine is shown which forms flat steel strip into tubing, welds the seam formed by the edges of the strip when brought together and passes the tubing, after the exterior surface thereof has been suitably prepared, through a hot dip molten zinc bath to galvanize it. Many applications for such tubing require that its interior surface be coated with paint or similar protective films in order to inhibit corrosion in certain environments in which the tubing is to be used. Heretofore, it has been the practice to apply such interior protective films after the tubing has been formed and cut into desired lengths. This is essentially a mechanical-hand type of operation which has the disadvantage of being of relatively high cost and relatively slow.

Therefore, it is an object of this invention to provide a novel method and machine for the continuous in line manufacture of galvanized tubing which is provided with an interior protective coating.

It is another object of this invention to provide a novel method and apparatus for the continuous manufacture of galvanized tubing which is capable of relatively high rates of production and substantially reduces manufacturing costs under those achieved by prior art methods and machines.

These and other objects are achieved by the invention by providing a novel continuous tube forming and galvanizing machine which is capable of applying paint or other protective coatings to the interior surface of the tubing at a stage in the manufacture of such tubing when the interior surface is exposed or otherwise accessible to paint applying means.

BRIEF DESCRIPTION OF THE FIGURES

The subject matter which is regarded as the invention is particularly pointed out and distinctly claimed in the concluding portion of this specification. Embodiments of the invention both as to their structure and manner of operation together with further objects and advantages thereof may be best understood by reference to the following description taken in connection with the accompanying drawing in which:

FIG. 1 is a diagrammatic illustration of apparatus embodying the invention;

FIG. 2 is a side view in cross section of a portion of the apparatus illustrated diagrammatically in FIG. 1;

FIG. 3 is a side view illustrating the apparatus of FIG. 1;

FIG. 4 is a diagrammatic illustration of an alternative apparatus embodying the invention;

FIG. 5 is a side view in cross section of a portion of the apparatus of FIG. 4;

FIG. 6 is an end view along the line 6—6 of FIG. 2;

FIG. 7 is a cross-sectional view of coated tubing produced in accordance with the invention;

FIG. 8 is an illustration of a first embodiment of a lance usable in accordance with the invention; and FIG. 9 is an illustration of another embodiment of a lance usable in accordance with the invention.

DETAILED DESCRIPTION

The U.S. Pat. to Krengel et al. No. 3,122,114 referred to above discloses a machine for continuously forming and galvanizing steel tubing. The disclosure of that patent is hereby incorporated by reference into the disclosure of this application and the embodiments of this invention are explained in conjunction with that disclosure. As set out in the Krengel et al. patent, a machine is provided for fabricating galvanized steel tubing in a continuous manner. A first portion of the machine disclosed therein includes a means for providing a continuous supply of strip steel which is passed through a series of tube forming rolls to bring the lateral edges of the strip together in order to form the tubing. Following the tube forming rolls there is provided means for welding seam formed by the lateral edges when brought together. The tube so formed then passes through a series of outer surface preparation stages and is then passed through a bath of molten zinc whereby the outer surface is galvanized.

There are a number of applications for galvanized tubing which require that the interior surface or wall of the tubing be coated with a protective film in order to inhibit corrosion. This application is concerned with providing means to apply such a protective film in a continuous in line machine of the type disclosed in the Krengel et al patent.

One embodiment of this invention is disclosed in FIG. 1. The apparatus and method of this embodiment is provided to paint or coat a surface of the steel strip that is subsequently to constitute the interior wall of the formed tube with a corrosion resistant coating. Inasmuch as the formed tubing passes through the machine at relatively high temperatures, it is necessary to provide a coating which is stable at the high temperatures to be encountered. A first source of high temperature occurs at the point in the machine where the seam is to be welded. Inasmuch as the welding operation involves the melting of the steel, temperatures on the order of 2,300° F. may be expected. To provide a paint which will not burn off at this temperature is somewhat difficult and unnecessarily expensive so that the apparatus and method of FIG. 1 includes means which render the use of such a paint unnecessary. However, the galvanizing operation itself which occurs downstream in the machine after the welding has been completed similarly involves the presence of high temperatures. In this case, the temperatures are encountered when the tubing is preheated prior to entering the bath of molten zinc and during its passage through that bath. These temperatures are on the order of 600°–900° F. so that it has been found that the provision of a paint or coating material which is stable and can be cured at those temperatures is feasible and can be applied in a continuous manner.

The paint having the thermostability qualities required can be formulated using a variety of coatings such as epoxy urea or melamine coatings modified with silicone resins and selected pigmenting agents. Such paints include solvents which must be removed and also they must be cured to effect thermosetting of the composition.

In FIG. 1, there is shown apparatus which includes means for preparing the surface of the flat strip steel for painting as it is fed from a source of such material as for instance a supply roll as shown in the Krengel et al patent. This constitutes a cleaning and preparation stage 1 which may be an alkaline cleaner for cleaning the surface which is then rinsed from that surface. The surface is then treated with a suitable metal treatment such as a phosphate which is rinsed with water and then with chromic acid. If desired, a primer material to insure adherence of the paint to the surface may be applied by the apparatus at this stage. Alternatively, if desired, the surface may be just prepared by washing it with a suitable ablative cleaner to assure a clean surface. If this is done, the cleaner must be rinsed in order to remove it completely.

In the embodiment of FIG. 1, a lance or elongated tube 12 is used. The lance 12 has a vertically extending portion 14 which is provided with means for connection to a source of paint (not shown). The portion 14 extends vertically downward through the tube forming rolls 8 intermediate their ends prior to the point where the rolls have brought the lateral edges of the flat strip together to form the completed tubing 22. The portion 14 is bent at 16 and extension 18 is provided to extend substantially parallel to the longitudinal axis of the tubing into the formed tubing pass the point where the seam is to be welded. The extension 18 is provided at its free end with a nozzle 20. The nozzle 20 is designed to provide a spray of paint to completely coat the inside surface of the formed tubing 22. In the embodiment illustrated this may take the form of a nozzle or a series of nozzles having a plurality of holes 21 completely around its periphery to provide a spray of paint for 360°. In this embodiment of the invention the drying or removal of the solvents in the paint is accomplished by the heat present in the tubing 22 and the curing of the paint is effected by the heat present in the preheating and galvanizing stages.

In order to produce a finished product in which the interior wall is smooth, that is, free rough spots which may be caused by splatter accumulating on the interior wall from the welding operation, an inert purge gas such as nitrogen should be blown through the tube. This may be accomplished by providing a blower 23 or compressed gas source positioned where the tube forming is substantially complete and having an outlet into the formed tubing downstream of the welder. Such a purge gas will also be effective to aid in the removal of coating solvents and in preventing such solvents from returning to the vicinity of the welder and igniting as the result of high temperatures in that area. While air may be used as a purge gas, nitrogen or some other inert gas is preferred.

The manner in which the elongated tube or lance 12 enters the partially formed tubing is further illustrated in FIGS. 3 and 6. In these figures, the flat strip steel 1 is shown being formed gradually by the tube forming rolls 8 into completed tubing 22. Thus, the tube forming rolls shape the flat strip 1 in such a way as to have progressively rising side walls 24 which at approximately the location designated by reference numeral 26 come together to form the seam as shown at 30 in FIG. 7. FIG. 3 illustrates some of the tube forming rolls provided to shape the strip into the desired configuration. Following the point 26 the seam is welded so that the nozzle 20 of the extension 18 extends beyond the point of the weld a distance sufficient so that the temperature of the material at the weld and in the vicinity thereof has dropped sufficiently to permit the coating to be applied. In order to support the extension 18 and prevent it from rubbing against the surface of the tubing suitable spacers such as the one shown at 32 may be provided to maintain the extension 18 in a relatively fixed position.

The extension 18 may be supported and centered in the formed tubing 22 by means of a plurality of spring wires 32 secured as by soldering around its periphery. The free ends of the wire which are biased outwardly bear against the interior wall of the tubing to support and center the extension 18.

It is an important aspect of this invention that the method and apparatus shown is one which produces in a continuous fashion steel strip which has been formed into a cylindrical tube and other similar configurations and has its exterior surface galvanized while its interior has been coated by a protective paint. In order to produce this result, the use of a protective coating which is heat stable and may be cured at the relatively high temperatures encountered is important. Further, the utilization of elements of a machine and steps of a method which have heretofore been used for the single purpose of galvanizing the formed strip permits the achievement of economies in the construction of the apparatus and consequently in the cost of the final product and does not introduce complications requiring reduction of operating speed.

In the alternative embodiment of FIG. 4, a painting stage 4 which may take the form of any one of several conventional devices for applying paint is used. For instance, the painting could be applied by roller or a curtain coating apparatus. Regardless of which of these techniques are used it is important that only the flat surface be coated and that the lateral edges of the strip remain free of paint. Were paint to coat the lateral edges its presence would interfere with the welding of those edges at a subsequent point in the machine.

After painting, the strip may then pass to a drying and partial curing stage 6 in which there may be provided any suitable source of heat to remove the solvents from the paint. Heat for drying, that is removal of solvents, and partial curing may be provided by any one of a number of means such as gas heaters, hot air or radiant heat sources powered by electricity.

After drying, the painted strip then enters a series of tube forming rolls 8 which progressively bend the strip into a tubular configuration. After leaving the tube forming rolls, the formed tubing then passes to a welding stage 10. Welding may be achieved by any number of methods such as electrical resistance, RF welding, DC welding, etc. Upon leaving the welding stage 10 the tubing has now been formed completely and the seam thereof welded so that it is now ready for surface preparation and galvanizing.

As explained above, the temperatures encountered in the welding stage are quite high on the order of 2,300° F. These temperatures, however, are encountered for a relatively short period due to the rapid travel of the tubing and consequently develop in a relatively constructed area, that is, in the area of the seam, particularly the interface of the seam and a short distance of the tubing wall on either side thereof. The effect of these high temperatures is to burn off the coating that had been applied in the vicinity of the seam. In order to insure that the interior wall of the tubing is completely painted, including the area in the vicinity of the seam, there is provided a means to apply a new coat of paint to that area after the welding has been completed. This means takes the form of a lance or elongated tube which is inserted intermediate the tube forming rolls at a point prior to the place in those rolls where the lateral edges are brought completely together. This is illustrated in FIG. 1 in diagrammatic fashion by a portion of this elongated tube or lance designated by reference numeral 12.

In FIG. 2, it may be seen that the lance 12 has a portion 14 which extends vertically from the tubing 1. The portion 14 extends upwardly between the tube forming rolls and is provided with means to be connected to a source of paint supply (not shown). The lance 12 is bent at 16 and is provided with an extension 18. In the case where fast reacting thermosetting coatings are used, the lance should be water cooled to prevent the paint from gelling in the lance.

FIGS. 8 and 9 illustrate alternative embodiments of suitable lance structures. In FIG. 8, the lance is constituted by a first tube 34 through which the coating material is conveyed. When cooling is required, secured to the first tube 34 is a second tube 36. The tube 36 is bent back upon itself at the outer end of the lance so that it provides two runs along the substantial length of the lance. The end of one run may be connected to a source of cooling water while the end of the other run is connected to a return to that source so that water may be caused to circulate through the tube 36 to maintain the temperature of the paint at a value where it will not commence to be cooled and gell in the lance. FIG. 9 comprises three concentric tubes wherein the paint is passed through the inner tube 38 and a center or intermediate tube 40 is connected to a source of cooling water.

The extension 18 is disposed substantially parallel to the longitudinal axis of the steel strip and the formed tubing and is of such a length as to extend into the tubing pass the point where the lateral edges are brought completely together by the forming rolls to provide the seam to be subsequently welded. The length is also such that it extends into the formed tubing pass the welding stage 10 and is provided at its free end with a nozzle 20' having an opening 21' aimed upwardly toward the welded seam from which paint has been burned off as a result of the welding operation. Paint supplied via the extension 14 is sprayed on that seam and on the adjacent surface of the interior wall of the tubing from which the paint has been burned to apply what might be characterized as a touch up coat in order that the interior surface will be completely painted as shown by reference numeral 19 in FIG. 7. It has been found that an airless paint spray system is particularly suitable for supplying paint through the lance. However, under certain circumstances conventional air spray systems can be used.

It should be noted at this point in the manufacture of the tubing that its temperature is such that the coating applied by the nozzle 20 will be dried or have its solvents removed rather promptly. The formed tubing 22, as noted above, then enters the surface preparation stages disclosed in the Krengel et al patent and is subsequently preheated and passes through the zinc bath. The temperatures encountered in the preheating and coating stages are such that the paint will be cured.

It may be seen the method and machine disclosed provide a means whereby galvanized tubing with its interior surface provided with a protective coat may be fabricated in a continuous manner at high speeds thereby achieving high production rates and with substantial economies over those of the prior art.

Although in accordance with the provisions of the patent statutes this invention is described as embodied in various forms and the principle has been explained together with the best mode in which it is not contemplated applying that principle, it will be understood that the apparatus shown and described is merely illustrative and the invention is not limited thereto since alterations and modifications will readily suggest themselves to persons skilled in the art without departing from the true spirit of the invention or from the scope of the annexed claims.

What is claimed as new and desired to be secured by Letters Patent of the United States is:

1. The method of continuously fabricating from flat strip steel galvanized tubing having a coated interior surface comprising the steps of: supplying flat strip steel from a source of such material; continuously forming the flat strip steel into a tubular configuration and continuously applying a coat of a composition comprising a pigmenting agent and a thermally stable binder curable at a relatively high temperature to the surface of the flat strip forming the interior wall of the formed tubing; continuously welding the seam formed by the lateral edges of the strip and passing the formed tubing through a molten bath of zinc to galvanize it while at the same time curing the composition coated on the interior wall of the formed tubing.

2. The method of claim 1 wherein the application of a coat of the composition is effected by the steps of first coating the flat strip before it is formed into a tubular configuration while at the same time maintaining the edges thereon free of the coating composition and then coating the interior wall of the formed tubing in the vicinity of the welded seam in order to coat the area around the seam from which the previously applied coating may have been burned away by the welding step.

3. The method of claim 1 wherein the application of a coat of the composition is effected by applying said coating to the interior wall of the formed tubing after the seam has been welded.

4. The method of claim 1 including the step of supplying a purge gas into the formed tubing after it has been welded.

5. The method of claim 4 wherein the purge gas is an inert gas.

6. The method of claim 4 wherein the purge gas is nitrogen.

* * * * *